Jan. 9, 1945.  A. Y. DODGE ET AL  2,366,842
COMBINED ONE-WAY CLUTCH AND BEARING
Filed Aug. 26, 1943
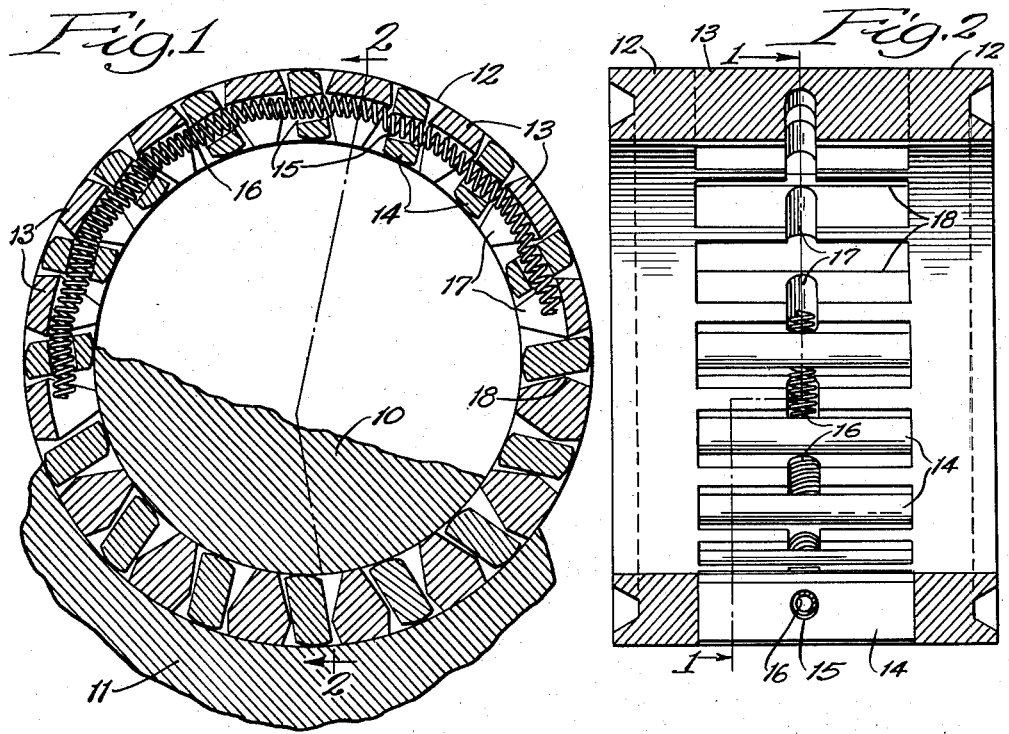
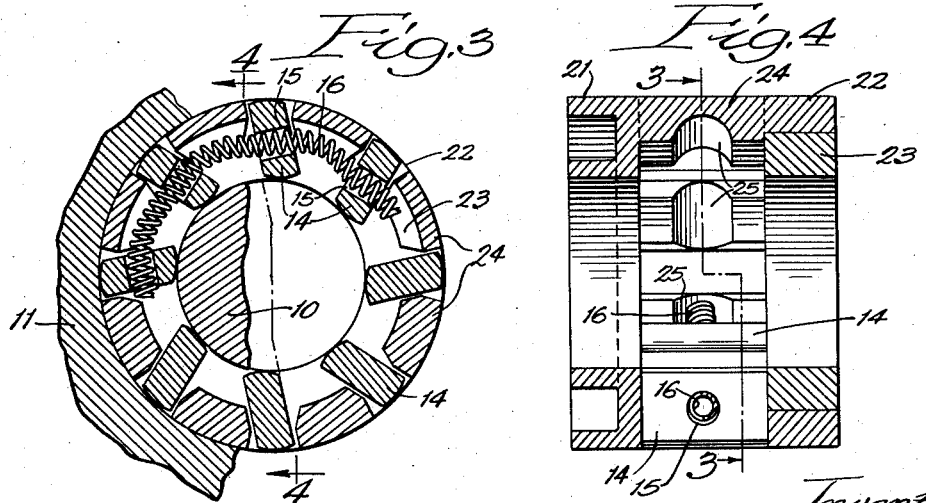
Inventors:
Adiel Y. Dodge
and Carl E. Swenson,
By Dawson Ooms and Booth,
Attorneys.

Patented Jan. 9, 1945

2,366,842

UNITED STATES PATENT OFFICE 2,366,842

COMBINED ONE-WAY CLUTCH AND BEARING

Adiel Y. Dodge and Carl E. Swenson, Rockford, Ill.

Application August 26, 1943, Serial No. 500,034

14 Claims. (Cl. 192—45.1)

This invention relates to combined one-way clutch and bearing and more particularly to a unit for connecting cylindrical races for free rotation in one direction and driving connection in the opposite direction.

One of the objects of the invention is to provide a simple and inexpensive construction which can be easily manufactured and assembled and which provides an efficient bearing connection in one direction and positive gripping in the opposite direction.

Another object of the invention is to provide a combined one way clutch and bearing in which the cage for holding the clutch gripper elements forms the bearing unit. In one desirable construction both the cage and rings and cross bars are formed to engage the races to provide a bearing connection therebetween.

Still another object of the invention is to provide a combined one way clutch and bearing in which the clutch grippers are held in place in the cage by an annular spring received in open grooves in the cage cross bars.

A further object of the invention is to provide a combined one way clutch and bearing in which the cage cross bars are so shaped as to engage the clutch grippers at points spaced from the radial centers of the grippers to assist in controlling the tilting action of the grippers.

The above and other objects and advantages of the invention will be more readily apparent from the following description when read in connection with the accompanying drawing, in which—

Figure 1 is a transverse section of a combined clutch and bearing unit embodying the invention on the line 1—1 of Figure 2;

Figure 2 is a section on the line 2—2 of Figure 1 with parts omitted;

Figure 3 is a view similar to Figure 1 of an alternative construction on the line 3—3 of Figure 4; and Figure 4 is a section on the line 4—4 of Figure 3 with parts omitted.

The unit of Figures 1 and 2 is adapted to connect spaced inner and outer races 10 and 11 which are formed with facing cylindrical surfaces. The unit includes a cage having annular end rings 12 connected by circumferentially spaced cross bars 13 which may be formed integrally with the end rings or rigidly connected thereto in any desired manner. The end rings and cross bars are of such a thickness as to engage the inner and outer races and are finished on their inner and outer surfaces to provide bearing surfaces engaging the races. Thus, the bearing load between the races is carried by the end rings and cross bars which serve to connect the races for free rotation.

A series of tiltable grippers 14 are mounted between the cross bars and may be shaped as more particularly described and claimed in the copending application of Adiel Y. Dodge, Serial No. 479,695 filed March 19, 1943. Each of the grippers is formed with a transverse opening 15 therethrough to receive an annular coil spring 16 for holding the grippers assembled in the cage and for urging them to tilt into engaged position as more particularly described and claimed in the copending application of Carl E. Swenson, Serial No. 490,969 filed June 16, 1943. The spring 16 is adapted to be received in open grooves 17 extending circumferentially in the inner surfaces of the cross bars so that the spring and grippers will be securely held in assembled position in the cage when it is not between the races.

Tilting of the grippers in operation is controlled by engagement with the cross bars 13 and in order that the grippers may be actuated promptly the cross bars are shaped in section as shown in Figure 2 with their maximum width at a point 18 spaced radially outward of the radial center of the cross bars and with the cross bars tapering inwardly in both directions from their maximum thickness. This provides between the cross bars openings of a substantially hour glass shape so that the grippers may tilt freely and are engaged by the cross bars outwardly of their radial centers.

In assembling the unit the grippers are first threaded on the spring and the spring ends are connected as explained in said Swenson application. The grippers may then be forced into the cage by compressing the spring and when they are released the spring will press them outwardly between the cross bars to hold them in assembled position as shown. Due to the angle of the openings 15 the spring also acts to tilt the grippers towards engaging position so that they will engage the races more quickly. When the inner race is rotating in a clockwise direction relative to the outer race, the grippers will be tilted to the position shown in Figure 1 in which they are out of engagement with the races and the races can turn freely on the bearing surfaces provided by the end rings 12 and cross bars 13. Upon a reversal of direction when the outer race 11 tends to overrun the inner race 10 in a clockwise direction, the grippers will be tilted clockwise to engage and connect the race surfaces. The cage normally tends to turn with the outer race due to engagement of the grippers therewith in response to centrifugal force so that at this time the cross bars 13 at their points of maximum width strike the grippers above their radial centers and tend to tilt them clockwise so that they will move into engaged position quickly with a minimum of lost motion.

The embodiment shown in Figures 3 and 4 is substantially similar to that shown in Figures 1 and 2 and identical parts therein are designated by the same reference numerals. In this construction the cage may be cast or otherwise integrally formed with a U-shaped end ring 21 which is made hollow to lighten the construction and a second end ring 22 of substantially half the thickness of the ring 21. A removable ring 23 is fitted into the ring 22 and may be removed more easily to assemble the grippers in the cage, the rings 22 and 23 having a combined thickness equal to that of the ring 21 so that both rings act as bearings between the races. Cross bars 24 connect the end rings and are formed as shown flush with the outer surfaces of the end rings to engage the outer race but terminating at their inner surfaces short of the inner race. The cross bars are shaped as seen in Figure 3 to engage the grippers outwardly of their radial centers to assist in tilting them into engaged position as described above. The cross bars are further formed with grooves 25 to receive the spring 16 so that the grippers will be held more securely in assembled position in the cage.

In operation of this construction, the increased bearing surface against the outer race increases the tendency of the cage to turn with the outer race so that the effect of the cross bars engaging the grippers to tilt them to engaged position is increased. Furthermore, the cage may be substantially lightened by reducing the cross bar thickness as well as by making the end rings hollow.

While several embodiments of the invention have been shown and described herein in detail, it will be understood that these are illustrative only, and are not intended as definition of the scope of the invention, reference being had for this purpose to the appended claims.

What is claimed is:

1. A combined one way clutch and bearing comprising inner and outer cylindrical races, a cage mounted between the races including a pair of annular end rings with smooth inner and outer surfaces engaging the races to form bearings therefor and spaced cross bars connecting the rings, and a series of tiltable grippers between the cross bars to engage the races and connect them for rotation in one direction.

2. A combined one way clutch and bearing comprising inner and outer cylindrical races, a cage mounted between the races including a pair of annular end rings with smooth inner and outer surfaces engaging the races to form bearings therefor and spaced cross bars connecting the rings, a series of tiltable grippers between the cross bars, and an annular spring connecting the grippers to hold them in place in the cage and to urge them to tilt in one direction, the cross bars having grooves cut in one face thereof to receive the spring.

3. A combined one way clutch and bearing comprising inner and outer cylindrical races, a cage mounted between the races including a pair of annular end rings with smooth inner and outer surfaces engaging the races to form bearings therefor and spaced cross bars connecting the rings, the cross bars being flush with the ring surfaces on at least one side to form additional bearing surfaces, and a series of tiltable grippers between the cross bars.

4. A combined one way clutch and bearing comprising inner and outer cylindrical races, a cage mounted between the races including a pair of annular end rings with smooth inner and outer surfaces engaging the races to form bearings therefor and spaced cross bars connecting the rings, the cross bars being flush with the ring surfaces on at least one side to form additional bearing surfaces, and a series of tiltable grippers between the cross bars, the cross bars being so constructed and arranged as to engage the grippers on said one side of their radial centers to assist in tilting the grippers.

5. A combined one way clutch and bearing comprising inner and outer cylindrical races, a cage mounted between the races including a pair of annular end rings with smooth inner and outer surfaces engaging the races to form bearings therefor and spaced cross bars connecting the rings, the cross bars being of the same thickness as the rings and having smooth inner and outer surfaces to form additional bearing surfaces, and a series of tiltable grippers between the cross bars.

6. A combined one way clutch and bearing comprising inner and outer cylindrical races, a cage mounted between the races including a pair of annular end rings with smooth inner and outer surfaces engaging the races to form bearings therefor and spaced cross bars connecting the rings, the cross bars being of the same thickness as the rings and having smooth inner and outer surfaces to form additional bearing surfaces, a series of tiltable grippers between the cross bars, and an annular spring connecting the grippers, the cross bars being formed with circumferentially extending grooves to receive the spring.

7. A combined one way clutch and bearing comprising inner and outer cylindrical races, a cage mounted between the races including a pair of annular end rings with smooth inner and outer surfaces engaging the races to form bearings therefor and spaced cross bars connecting the rings, the cross bars being of the same thickness as the rings and having smooth inner and outer surfaces to form additional bearing surfaces, and a series of tiltable grippers between the cross bars, the cross bars being of maximum thickness between their inner and outer surfaces whereby to engage the grippers intermediate their edges.

8. A combined one way clutch and bearing comprising inner and outer cylindrical races, a cage mounted between the races including a pair of annular end rings with smooth inner and outer surfaces engaging the races to form bearings therefor and spaced cross bars connecting the rings, the cross bars being of the same thickness as the rings and having smooth inner and outer surfaces to form additional bearing surfaces, and a series of tiltable grippers between the cross bars, the cross bars being of maximum thickness at points adjacent their outer surfaces and converging inwardly and outwardly therefrom to engage the grippers at points outward from their radial centers.

9. In a one way clutch and bearing, a cage comprising spaced annular rings having smooth inner and outer bearing surfaces and a series of spaced rigid cross bars connecting the rings, the cross bars having circumferentially extending grooves therein to receive an annular spring.

10. In a one way clutch and bearing, a cage comprising spaced annular rings having smooth inner and outer bearing surfaces and a series of spaced rigid cross bars connecting the rings, the cross bars having their maximum circumferential thickness at points between their radial centers and their outer surfaces and being adapted to support tiltable grippers between them.

11. In a one way clutch and bearing, a cage comprising spaced annular rings having smooth inner and outer bearing surfaces and a series of spaced rigid cross bars connecting the rings, the cross bars being of the same radial thickness as the rings to provide additional bearing surfaces and having their maximum circumferential thickness at points between their radial centers and their outer surfaces and being adapted to support tiltable grippers between them.

12. In a one-way clutch and bearing, a cage comprising spaced annular rings and a series of spaced cross bars connecting the rings and adapted to receive tiltable grippers between them, the sides of the cross bars being so shaped as to provide between them openings for the grippers which are substantially hour glass shaped.

13. In a one-way clutch and bearing, a cage comprising spaced annular rings and a series of spaced cross bars connecting the rings and adapted to receive tiltable grippers between them, the sides of the cross bars being so shaped as to provide between them openings for the grippers which are substantially hour glass shaped, with the portion of minimum circumferential width closer to the outside than to the inside of the cross bars.

14. A combined one-way clutch and bearing for connecting cylindrical inner and outer races comprising a series of circumferentially spaced cross bars, a series of tiltable grippers between the cross bars to engage the races, and an annular ring connecting the cross bars and formed at its inner and outer surfaces to engage the races and to act as a bearing between them.

ADIEL Y. DODGE.
CARL E. SWENSON.